C. A. CRIQUI AND E. T. LARKIN.
MECHANISM FOR CONTROLLING LUBRICATION OF EXPLOSION ENGINES.
APPLICATION FILED DEC. 31, 1918.
1,353,894.
Patented Sept. 28, 1920.
2 SHEETS—SHEET 1.
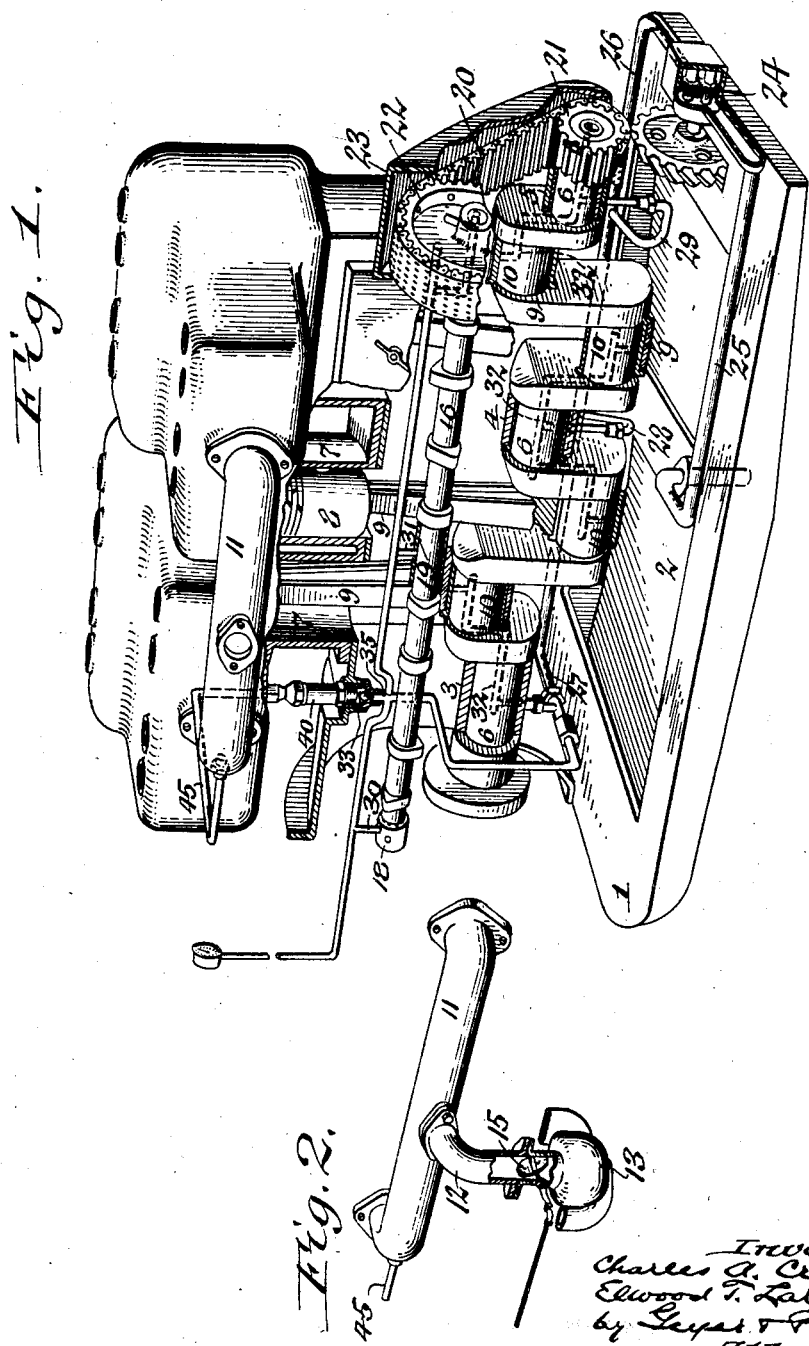

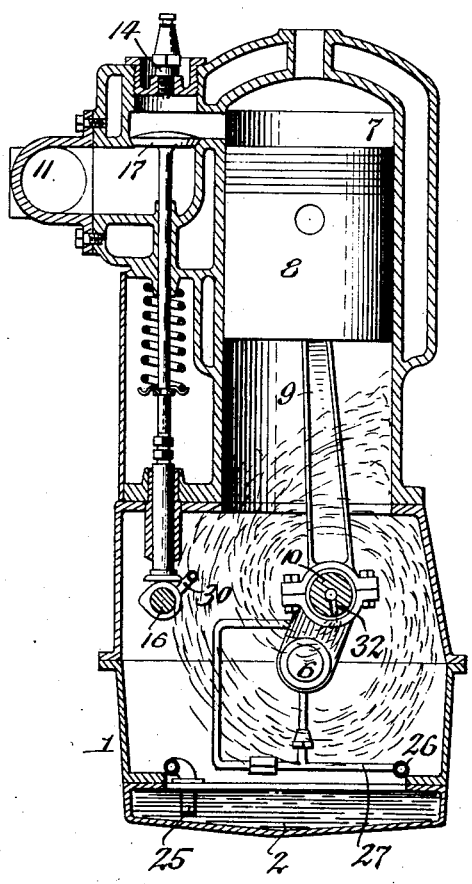
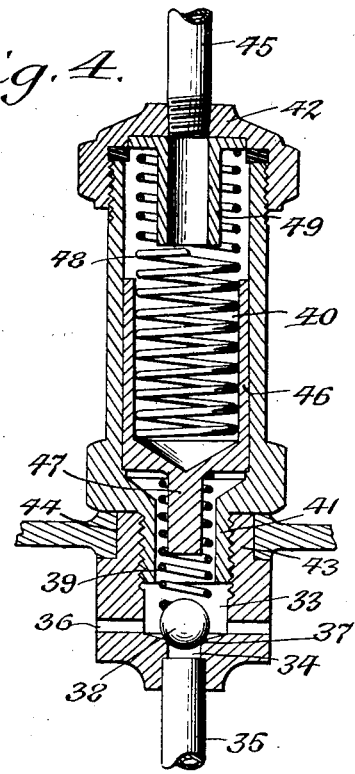

UNITED STATES PATENT OFFICE.

CHARLES A. CRIQUI AND ELWOOD T. LARKIN, OF BUFFALO, NEW YORK; SAID LARKIN ASSIGNOR TO SAID CRIQUI.

MECHANISM FOR CONTROLLING LUBRICATION OF EXPLOSION-ENGINES.

1,353,894.   Specification of Letters Patent.   Patented Sept. 28, 1920.

Application filed December 31, 1918. Serial No. 269,067.

*To all whom it may concern:*

Be it known that we, CHARLES A. CRIQUI and ELWOOD T. LARKIN, citizens of the United States, residing in Buffalo, in the county of Erie and State of New York, have invented new and useful Improvements in Mechanism for Controlling Lubrication of Explosion-Engines, of which the following is a specification.

In some explosion engines a lubricating apparatus is employed which embodies a pump from the outlet of which the oil is delivered to the parts to be lubricated, a sump from which the oil is supplied to the inlet of the pump and to which the excess oil is returned from the parts which were lubricated and a pressure maintaining device arranged in the delivery conduit of the pump and constructed to maintain oil at a predetermined pressure so that all parts will be properly supplied. As is well known an engine requires the greatest amount of lubrication when the same is heavily loaded but requires comparatively little lubrication when the same is running idly or under a light load. When running under a heavy load the throttle of an engine which controls the supply of fuel from the carbureter to the intake of the engine is usually in its full or nearly full open position so that a comparatively large amount of fuel is permitted to enter the cylinders of the engine and produce firing strokes of the pistons with sufficient power for taking care of the load imposed upon the engine. But when the engine is running idly or under a light load the throttle in the fuel supply conduit is nearly closed so as to reduce the fuel supply to the engine in accordance with the load reduction. When an engine is moving under a full load and is receiving its maximum fuel supply by reason of the throttle being wide open only a moderate vacuum is produced in the intake of the engine, inasmuch as the suction of the pistons at this time will draw the fuel freely through the intake into the cylinders preparatory to firing the same, but upon closing the throttle more or less when the engine is running idle or under a light load the admission of fuel into the intake is cut off accordingly, thereby increasing the vacuum within the intake by reason of the reciprocation of the pistons in the cylinders. Under these circumstances, in engines as heretofore constructed, the parts to be lubricated received substantially as much oil when the engine was running light as when the same was running with a heavy load thus involving an unnecessary waste of oil. Furthermore the vacuum existing at this time in the cylinders would cause the oil to be drawn past the pistons and cylinders and enter the firing spaces or chambers where the same would form carbon and prevent operation of the spark plugs. As a consequence the engine would not only operate inefficiently but the gasolene drawn from the intake into the cylinders by the pistons would gradually work down into the crank case and dilute the oil in the sump thereof so that the parts to which the same was supplied would be improperly lubricated. An accumulation of carbon in the firing space is also objectionable because the same becomes incandescent and causes pre-ignition.

It is the object of this invention to provide the lubricating system of an engine with means which are responsive to variations in the vacuum in the intake and will operate to vary the supply of oil to various parts to be lubricated in accordance with the load on the engine and thus not only effect a saving in the use of lubricating oil but also prevent undue deterioration of the same as well as prevent fouling of the firing space of the cylinders and the igniting device and thereby increase the efficiency of the engine and effect economy in the cost of operation.

In the accompanying drawings:

Figure 1 is a sectional perspective view showing one embodiment of our invention in a gas engine. Fig. 2 is a similar view of the intake manifold, the carbureter and the throttle valve. Fig. 3 is a vertical transverse section of the engine taken through one of the cylinders, the valve mechanism and the crank case. Fig. 4 is a fragmentary vertical section, on an enlarged scale, showing the preferred organization of the means which coöperate with the oiling system of the engine for varying the supply of oil to the parts to be lubricated in accordance with the load upon the engine.

Similar characters of reference refer to like parts throughout the several views.

Our invention may be variously organized and embodied in explosion engines having widely different types of oiling systems and it is therefore to be understood that the engine shown in the accompanying drawings and referred to in the following description is only an example of one of many forms in which our invention is capable of being utilized. In the engine shown in the drawings, the base 1 is made hollow so as to form a crank case or chamber. The lower portion of this crank case forms a sump 2 which is adapted to hold the supply of oil for lubricating various parts of the engine. Arranged lengthwise in this base and journaled in bearings 3, 4, 5 thereon is the main or crank shaft 6. Mounted on top of the base and communicating at their lower ends with the interior thereof are a plurality of working or firing cylinders 7 each of which contains a power or working piston 8, which is connected by a pitman or connecting rod 9 with one of the cranks or wrists 10 of the crank shaft. 11 represents the intake manifold or conduit which communicates with the firing ends or chambers of the several working cylinders and is connected by means of a branch pipe or conduit 12 with a carbureter 13 whereby fuel and air are supplied to the intake for forming the combustible mixture which is conducted into the firing cylinders preparatory to being exploded therein by the igniting device of which the spark plugs 14 form a part. In that portion of the fuel supply conduit between the carbureter and the intake manifold is arranged a throttle valve 15 of any suitable construction which upon being opened fully will permit the maximum volume of the fuel to enter the manifold for increasing the power of the engine when the same is more or less heavily loaded but which is nearly closed for reducing the supply of fuel to the intake manifold and firing cylinders and cutting down the effectiveness of the explosions when the load upon the engine is reduced materially or the same is running idle. 16 represents the horizontal cam shaft forming part of the mechanism whereby the intake and exhaust valves of the engine are operated, one of the valves being shown at 17 in Fig. 3. This shaft is journaled in bearings 18, 19 and may be driven from the crank shaft by any suitable means, for instance, by means of a belt 20 passing around belt wheels 21, 22 secured to the corresponding ends of the crank shaft and the valve shaft. This belt and the companion wheels are inclosed in a casing 23 which communicates with the interior of the crank case so as to practically form a part thereof.

The lubricating apparatus which is shown in the drawings in connection with this engine as typical of one suitable for use in connection with our invention, comprises a gear pump 24 which is mounted on the base and driven from the crank shaft or other moving part of the engine in any suitable manner. Oil is supplied to the inlet of this pump by means of a supply conduit 25 which is connected at one end with the inlet of the pump while its opposite end extends into the sump of the engine base so that when the pump is in operation oil may be withdrawn from the sump. The outlet of this pump may be connected with the various parts which are to be lubricated in any well known and approved manner. For instance, as shown in the drawings, this is accomplished by providing an oil delivery manifold conduit 26 which is connected with the outlet of the pump and has a plurality of branch pipes 27, 28, 29 leading to the several main bearings of the crank shaft, and branch pipes 30, 31 leading to the bearings 18, 19 of the cam shaft. Each wrist or crank 10 is supplied with oil so as to lubricate the joint between the same and the pitman by means of an oil conduit or duct 32 extending from the adjacent main bearing through the crank shaft to the surface of the respective wrist in the usual and well known manner. As the journals of the crank shaft and its cranks or wrists rotate during the operation of the engine the excess oil escaping from the same is thrown off tangentially in all directions so that part of this surplus oil drops back directly into the sump of the base while other parts strike the walls of the crank case and are conducted into the sump and still other parts are thrown upwardly against the lower parts of the bores of the cylinders, as shown in Fig. 3, so that the same is picked up by the periphery of the pistons sliding therein, thereby lubricating the joint between the pistons and cylinders and causing the same to run easily and without undue wear.

For the purpose of maintaining a sufficient predetermined pressure on the oil in the delivery conduit of the pump and its branches so as to insure carrying sufficient oil to the various parts which are to be lubricated a relief or pressure maintaining device is provided which may be of various forms but which in the type shown in the drawings comprises a relief or pressure maintaining valve chamber 33 which is arranged adjacent to the upper part of the crank case and provided with an inlet 34 which is connected by means of a branch pipe 35 with the oil delivery manifold and also with one or more outlet ports 36 which open into the crank case and also with an internal valve seat 37, a relief or pressure maintaining valve 38 preferably of spherical form engaging with the seat 37 and adapted to open away from the inlet of the relief chamber, and a relief spring 39 arranged within the relief chamber and engaging with the relief valve for the purpose of holding the same yieldingly to its seat. The tension of the spring 39 is so determined that it holds the valve 38 shut until the pressure of the oil within the delivery manifold and the branches thereof has risen to a predetermined point, say twenty-five pounds. But when the pressure of the oil in the delivery conduit exceeds this pressure then this relief valve will open by overcoming the resistance of the spring 39 whereupon the excess oil will escape through the outlet or overflow ports of the relief chamber into the crank case and return to the sump. By this means sufficient pressure is maintained in the oil delivery conduit to insure delivery to all of the parts to be lubricated and still permit the excess oil to flow back into the sump through the by-pass which is afforded by the outlets of the relief chamber.

Above the pressure maintaining chamber is arranged a controlling chamber 40 which preferably has the form of a cylinder the lower end of which is provided with an external screw threaded tubular neck 41 which screws into the upper end of the maintaining chamber while the upper end of the controlling chamber is formed by a cap 42. The maintaining and controlling chambers are preferably mounted upon the upper part of the crank case by providing the upper part of the maintaining chamber with an upwardly projecting tubular neck 43 which engages with an opening 44 in the upper part of the crank case and so organizing the parts that when the maintaining and controlling chambers are screwed together the upper part of the maintaining chamber bears against the inner side of the crank case and the lower part of the controlling chamber bears against the outer side of the crank case as shown in Figs. 1 and 4. The upper part of the controlling chamber communicates with the intake manifold, this being preferably accomplished by means of a pipe 45 extending through the upper cap of the controlling chamber and connected with a suitable part of the intake manifold, as shown in Figs. 1 and 4. Within the controlling chamber is arranged a member which is adapted to be raised by the vacuum or suction in the intake chamber, this member being preferably constructed in the form of a piston 46. At its upper end the maintaining or relief spring 39 bears against the underside of the controlling piston 46, the latter being provided at its lower end with a centering pin or stem 47 which enters the upper coils of the maintaining spring and holds the latter in place. The controlling piston is preferably made hollow but closed at its lower end and open at the upper end thereof so as to render the same light and also to produce a compact structure. Within the controlling piston and upper part of the controlling chamber is arranged a helical controlling spring 48 which bears at its lower end against the bottom of the controlling piston while its upper end bears against a tubular centering thimble 49 which rests against the underside of the upper cap of the controlling chamber.

The adjustment or strength of the controlling spring 48 is so determined that the controlling piston is held in its lowermost position and forms a practically rigid or non-movable abutment for the relief or pressure maintaining spring 39 when the engine is running under a heavy load and the throttle valve 15 is practically wide open, at which time no appreciable suction or vacuum effect is produced in the intake and the conduits associated therewith by reason of the fact that sufficient fuel is supplied through the carbureter at this time to keep up with the demands of the pistons in the cylinders. The relief or pressure maintaining valve therefore at this time is only opened and permits the excess oil to escape from the oil delivery manifold into the crank case when the pressure in the delivery manifold exceeds the predetermined point at which the relief spring 39 has been set. When however, the throttle valve is closed to any extent for the purpose of reducing the fuel supply to the intake and cutting down the speed of the engine in accordance with the reduced load which may be imposed upon the same, then the supply of combustible mixture to the intake is reduced so that thereafter an appreciable vacuum is produced in the fuel intake during the continued reciprocation of the pistons which vacuum is sufficient to lift the controlling piston 46 by suction in opposition to the controlling spring 48. When this occurs the tension of the relief or maintaining spring 39 is reduced and the relief or pressure maintaining valve 38 is able to open under a reduced pressure of oil in the delivery pipe of the pump so that a greater quantity of oil will now return by way of this by-pass to the sump instead of being forced to the parts to be lubricated. When the throttle of the engine is again opened fully or substantially so for increasing the fuel supply in the event that the load upon the engine is increased then the vacuum or suction in the fuel intake is again lowered by reason of this vacuum being broken or partially broken by the entrance of the fuel into the manifold from the carbureter. This reduction of the vacuum in the intake reduces the suction on the controlling piston in the controlling chamber so that the controlling spring 48 is again permitted to push this piston downwardly and again serve as a practically rigid abutment for the relief spring 39 after which the relief or maintaining valve 38 will be again held against its seat with such pressure that the same will not open until the predetermined pressure under which oil is normally supplied to the various parts to be lubricated is again exceeded.

It will thus be observed that by this means less oil is supplied to the bearings and other parts to be lubricated when the engine is running idle or comparatively light and a larger amount of oil is supplied to these parts when the engine is running under full or heavy load and that this variation in the amount of oil supplied to the parts to be lubricated is controlled by means which are responsive to the variations in the suction or vacuum which is produced in the intake of the engine as the throttle is opened fully or nearly so to supply fuel to the engine when running under a heavy load or closed more or less for reducing the fuel supply to meet the needs of the engine when running idle or under a light load.

Inasmuch as a reduction in the supply of oil to the cranks or wrists of the main shaft when runnning idle or under a light load necessarily results in a reduction of the amount of oil which is thrown against the inner sides of the working cylinders it follows that at this time less lubrication of the coöperating surfaces of the cylinders and the working pistons occurs and less oil is therefore liable to work up between the cylinders and pistons into the firing spaces so that fouling of these spaces of the cylinders and the ignition devices arranged therein are less liable to occcur.

Moreover by this means the engine is maintained in a more efficient condition and requires less attention for obtaining the maximum output of the same. Furthermore by avoiding non-ignition due to fouling or short circuiting of the spark plugs by carbonization the liability of unconsumed gasolene creeping from the firing spaces between the pistons and cylinders into the oil within the crank case is reduced to a minimum, thereby avoiding thinning and weakening of the oil and insuring proper oiling of the parts.

Although the construction shown in the accompanying drawings and described in the foregoing specification is the best embodiment of our invention which has occurred to us at the present time, it is to be understood that the same is capable of various modifications to suit different types and installations of engines and the invention is therefore not to be limited to the construction here shown, but is intended to include all organizations in which regulation of the lubrication of the engine is dependent upon variations in the suction in the fuel intake of the working cylinders.

We claim as our invention:

1. An explosion engine having a firing cylinder, a fuel intake connected with said cylinder, a throttle for controlling the admission of fuel to said intake, a lubricating apparatus comprising a pump having an outlet connected by a delivery conduit with the parts to be lubricated, a sump from which the lubricating oil is conducted by a supply conduit to the inlet of said pump and to which the surplus oil returns from the parts to be lubricated, a pressure maintaining device comprising a valve chamber having an inlet communicating with said delivery conduit, an outlet communicating with said sump, and a valve seat between said inlet and outlet, a valve engaging said seat and opening away from said delivery conduit, and retaining means for holding said valve yieldingly against its seat, and controlling means for said valve comprising a movable element which supports said retaining means in its normal position and which is shifted in response to variations in the suction of said intake for permitting said valve to open more or less freely in accordance with variations in the position of said throttle and the load on the engine.

2. An explosion engine having a firing cylinder, a fuel intake connected with said cylinder, a throttle for controlling the admission of fuel to said intake, a lubricating apparatus comprising a pump having an outlet connected by a delivery conduit with the parts to be lubricated, a sump from which the lubricating oil is conducted by a supply conduit to the inlet of said pump and to which the surplus oil returns from the parts to be lubricated, a pressure maintaining device comprising a valve chamber having an inlet communicating with said delivery conduit, an outlet communicating with said sump, and a valve seat between said inlet and outlet, a valve engaging said seat and opening away from said delivery conduit, a retaining spring engaging one of its ends with said valve, a controlling piston engaging the other end of said retaining spring, a cylinder which receives said controlling piston, a controlling spring interposed between said piston and cylinder and a suction conduit connecting said controlling cylinder with said intake between said throttle and firing cylinder.

CHARLES A. CRIQUI.
ELWOOD T. LARKIN.